United States Patent [19]

Anton et al.

[11] Patent Number: 4,849,195
[45] Date of Patent: Jul. 18, 1989

[54] SYNTHETIC CRYSTAL AGGREGATES OF XONOTLITE AND PROCESS FOR PREPARING SAME

[75] Inventors: Octavian Anton, Brussels; Dirk Van Wouwe, Tisselt, both of Belgium

[73] Assignee: Redco N.V., Belgium

[21] Appl. No.: 192,080

[22] Filed: May 10, 1988

Related U.S. Application Data

[63] Continuation-in-part of Ser. No. 933,861, Nov. 24, 1986, abandoned.

[30] Foreign Application Priority Data

Nov. 29, 1985 [DE] Fed. Rep. of Germany ....... 3542247

[51] Int. Cl.$^4$ ............................................. C01B 33/24
[52] U.S. Cl. ..................................... 423/331; 423/326;
423/593; 423/598; 423/635; 423/636
[58] Field of Search ............... 423/326, 598, 593, 608, 423/610, 331, 635, 636

[56] References Cited

U.S. PATENT DOCUMENTS

| | | | |
|---|---|---|---|
| 2,127,844 | 8/1938 | Kinzie | 423/331 |
| 2,888,322 | 5/1959 | Podschus et al. | 423/331 |
| 3,501,324 | 3/1970 | Kubo | 106/120 |
| 3,672,825 | 6/1972 | Gambale et al. | 423/326 |
| 3,679,446 | 7/1972 | Kubo | 106/120 |
| 3,806,585 | 4/1974 | Takahashi et al. | 423/331 |
| 3,816,149 | 6/1974 | Zettel | 423/331 |
| 3,832,441 | 8/1974 | Schoenlaub | 423/84 |
| 3,928,539 | 12/1975 | Satoh et al. | 423/326 |
| 3,956,226 | 5/1976 | Blumenthal | 106/306 |
| 4,162,924 | 7/1979 | Kubo et al. | 423/331 |
| 4,298,386 | 11/1981 | Kubo et al. | 423/331 |
| 4,329,328 | 5/1982 | McAnespie et al. | 423/333 |
| 4,383,890 | 5/1983 | Oshima et al. | 162/157.6 |
| 4,545,970 | 10/1985 | Krijesman | 423/331 |
| 4,581,292 | 4/1986 | Shinpo et al. | 423/326 |
| 4,623,526 | 11/1986 | Lam Shang Leen | 423/326 |
| 4,647,499 | 3/1987 | Takahashi et al. | 106/120 |
| 4,656,016 | 4/1987 | Taramasso et al. | 423/326 |

FOREIGN PATENT DOCUMENTS

| | | | |
|---|---|---|---|
| 0166789 | 1/1986 | European Pat. Off. | 423/331 |
| 5645818 | 9/1979 | Japan | 423/326 |
| 85/02839 | 7/1985 | PCT Int'l Appl. | 423/331 |

*Primary Examiner*—Anthony McFarlane
*Attorney, Agent, or Firm*—Wegner & Bretschneider

[57] ABSTRACT

In synthetic, substantially spherical crystal aggregates of xonotlite having a particle size of more than 20 microns, and preferably up to 150 microns, up to 30% of the silicon atoms can be replaced by titanium or zirconium atoms, and inert particles can be incorporated in the crystal aggregates.

7 Claims, 6 Drawing Sheets

SYNTHETIC CRYSTAL AGGREGATES OF XONOTLITE AND PROCESS FOR PREPARING SAME

This is a continuation-in-part application of U.S. application Ser. No. 933,861 filed Nov. 24, 1986 now abandoned.

The present invention relates to synthetic, substantially spherical crystal aggregates of xonotlite having a particle size greater than 20 microns, and preferably up to 150 microns, which contain homogeneously ions or heterogeneously foreign materials.

Substantially spherical particles, 20 to 120 microns in size, composed of interlocked crystals of xonotlite and-/or tobermorite or other calcium silicate hydrates are known. For example, xonotlite spherical particles are marketed by the firm Promat, Ratingen, under the name of "Promaxon". The preparation has been described in U.S. Pat. Nos. 3,501,324 and 3,679,446 and in the EPS No. 0 009 836. They are mainly used for thermal insulation. From U.S. Pat. No. 3,679,446 it is known to subsequently mix the crystal aggregates of calcium silicate hydrates formed with fillers to modify thereby the properties and to lower the price of the final products. The subsequent introduction of these fillers is effected because the synthesis of xonotlite under the conditions mentioned above is extremely sensitive to interference, so that first efforts were always made to carry out the formation of the xonotlite in the absence of foreign materials and interfering ions, and the more or less inert fillers were added only after the xonotlite formation.

From WO No. 85/02839 it is known to add inert fillers such as silicon carbide, silicon nitride, calcium silicide, tin oxide, zirconium oxide, titanium oxide, manganese oxide and iron oxide to the starting slurry and thus to obtain a xonotlite, which includes therein heterogeneously distributed but physically united inert fillers.

The sensitivity to interferences by foreign ions during the crystallization of the xonotlite formation is known from the literature. Thus, the presence of aluminium accelerates the formation of tobermorite and increases the temperature range in which tobermorite is stable. The presence of only 1% of aluminium, based on the silicon content, will prevent the xonotlite formation or require a much higher temperature for the synthesis, resulting in a more expensive process.

The aluminum content of clays such as bentonites, kaolinites etc. inhibits the formation of xonotlite. Aluminum tobermorite is formed and/or calcium aluminate hydrates as well as gels instead of tobermorite. With respect to iron and magnesium, it has been known that these ions also prevent the xonotlite formation. Applicants' own investigations have fully confirmed these results. In attempts to replace part of the calcium ions by copper, cobalt, nickel or zinc, xonotlite that had been originally formed disappeared rapidly.

In the preparation of moulded calcium silicate articles according to German application DE-OS No. 33 06 341, because of this interference with the xonotlite crystallization, the material to be additionally introduced is added only in a second stage, after at least the calcium silicate hydrate of the type C-S-H(I) has already been formed. Then the added phases like glass fibres and silicon carbide will not interfere anymore with the conversion of C-S-H(I) to xonotlite. In Example 3 xonotlite is formed first, and only thereafter the additional phases are added. The process as described therein requires a twofold treatment under high pressure and, therefore, is economically unprofitable.

According to other prior art, fully prepared xonotlite was always admixed with the desired additives such as mica, sawdust, cellulose fibres or strongly infrared-absorptive particles (according to German application DE-OS No. 29 40 230) for applications like thermal insulation or fire protection.

It is the object of the present invention to develop synthetic, substantially spherical crystal aggregates of xonotlite having a particle size of at least 20 microns, and preferably up to 150 microns, and homogeneously or heterogeneously containing foreign ions or foreign particles in a manner as simple and economical as possible.

Surprisingly it has been found that said object can be attained by modifications of the previous conventional xonotlite syntheses. More specifically, it is possible to homogeneously replace up to 30% of the silicon atoms, preferably 0.1–30%, more preferably 1–30%, by titanium and/or zirconium atoms in the case that the molar ratio of silicon+(titanium/zirconium):calcium is approximately 1:1 and the reaction mixture is heated as fast as possible to the reaction temperature, i.e., within 2 hours. In contrast thereto, with slow heating for reaction, xonotlite and calcium titanates and/or calcium zirconates, respectively, are simultaneously formed in microcrystalline form, which are also only enclosed in part in the crystal aggregates of the xonotlite.

BRIEF DESCRIPTION OF THE DRAWINGS

FIG. 3 shows the X-ray diffraction pattern.

More or less inert particles having a particle size of more than 1 micron, on the other hand, are heterogeneously enclosed in the approximately spherical crystal aggregates of xonotlite in the case that they first are admixed with the $SiO_2$ and water and only thereafter with the hydrated or quick lime in a molar ratio of Si:Ca of approximately 1:1 and then are heated to the reaction temperature. As the more or less inert particles, more specifically, one may use mica, sawdust and cellulose fibres.

As $SiO_2$, we understand crystalline or amorphous types or mixtures of them. More or less inert phases like mica, sawdust, cellulose fibres may be advantageously mixed first with an amorphous silica after which the remaining quantity of crystalline silica and lime is added.

More specifically, if the inert particles are smaller than the xonotlite aggregates as normally obtained in the known processes, even upon inclusion of the inert particles approximately spherical structures are formed. Even mica containing aluminium can be incorporated in the xonotlite aggregates by using the process of the invention without terminating or preventing the xonotlite formation. If, however, mica is added by charging it into the aqueous hydrated lime slurry, then it will inhibit the xonotlite formation by release of aluminum. Apparently, in the course of the variant of the process of the invention, a thin protective layer of silicate is formed on the surface which prevents leaching the aluminum by hydrated lime. Thus, using the invention it is possible to interpenetrate mica homogeneously in the xonotlite crystal aggregates and to process these aggregates further in a per se known manner into insulating materials or fire protection materials, whereas according to the prior art it was only possible to mix xonotlite mechanically with mica and to mould the mixture. The free mica present in this mixture of the prior art can easily be oriented in the moulding process and creates weakness planes. Also the heterogeneous incorporation of sawdust or cellulose fibres in the xonotlite crystal aggregates according to the invention results in an essential improvement of the insulating materials manufactured therefrom. Since the surfaces of the aggregates consist of neat xonotlite, the crystal aggregates according to the invention can be processed in the same manner as the crystal aggregates fully consisting of neat xonotlite. At the same time the wood particles and fibres are intimately connected to the silicates matrix, performing better their role (increase of mechanical strength, increase of workability) and decreasing their negative influence (same negative effects on the calcium silicates matrix when lignin phases are present, CO release when the product is heated).

By an incorporation of opacifying particles (opacifying referring to the heat transfer through a low density moulded product), the heat insulation at high temperatures is significantly improved. The said particles are more economically used and better homogenized in the silicate matrix. The thermal insulating performances are considerably improved for products obtained according to the invention in comparison to the classical calcium silicate based products. The technique described by this invention allows the manufacture of very homogeneous, low density but mechanically strong insulating materials, easy to be handled, worked, cut, drilled.

Actually high performance thermal insulation products ("superinsulators") are difficult to be worked (cut and sawed, drilled) and special tools (laser) are sometimes needed. These insulation products are dry mixed compounds shaped in very brittle forms or enclosed in special fibre tissue or systems to preserve their shape.

The new aggregates of xonotlite provided by this invention in addition can be used as starting material for acid extraction of calcium atoms in order to obtain a silica, wherein up to 30% of the silicon atoms are replaced by titanium and/or zirconium.

Such an acid extraction is described in European application EP-A-No. 85 103 873.7. The acid hydrolysis is carried out preferably at a pH-range of from 0.6 to 3.0 at approximately room temperature with an acid that does not form a sparingly soluble calcium salt. A preferred acid is sulfamic acid. In principle, however, all other acids mentioned in EP-A-No. 85 103 873.7 can also be used with good results.

The products of the invention and the processes for preparing them are further illustrated by way of the following examples.

EXAMPLE 1

160 ml of water are heated at 60° C. 11.6 g of zirconium oxychloride octahydrate ($ZrOCl_2 \times 8H_2O$) are added, and the mixture is stirred for 5 min. Then 104 g of calcium oxide are added, and the mixture is stirred for 20 min. 127 g of $SiO_2$ are added, and the mixture is stirred for 3 min. Thereafter, 2400 ml of water having a temperature of 60° C. are added, and the entire mixture is transferred into an autoclave. It is then heated at 210° C. for 5 hours by introduction under saturated steam conditions (19 bar). After the reaction has been completed, a slurry of approximately spherical crystal aggregates having the usual size distribution of from 20 to 120 microns is obtained. The xonotlite structure has been confirmed by X-ray diffraction analysis. An energy dispersive spectroscopy analysis showed that the zirconium has been homogeneously incorporated in the crystal structure. No specific accumulations of zirconium can be determined. In comparison to the xonotlite aggregates having been analogously prepared in the absence of zirconium, it is observed that the individual needle-like crystals are from 2 to 3 times longer.

EXAMPLE 2

A mixture comprising 49% of calcium oxide, 45% of $SiO_2$ (ground quartz having an average particles size of about 14 microns) and 6% of amorphous titanium dioxide having an average particles size of about 5 microns is suspended in water, a water/solids content of 13 being formed. The suspension is stirred in an autoclave at 209° C. for 7 hours.

The temperature in the reaction vessel increased from 70° C. to 209° C. within 2 hours. The slurry thus obtained is filtered and dried at 110° C. The resulting product was identified by X-ray diffraction as being a xonotlite containing only traces of perovskite ($CaTiO_3$). The final product could be identified by light micriscopy as a mixture of spherical crystal aggregates having an average diameter of about 100 microns.

EXAMPLE 3

A mixture consisting of 45% of CaO, 33% of $SiO_2$ (ground quartz as in Example 2) and 22% of amorphous titanium dioxide (as in Example 1) is suspended in water to give a water/solids content of 13. The suspension is hydrothermally treated in an autoclave with stirring. The heating rate from 70° C. to 206° C. is 6 hours, and the mixture is maintained at the latter temperature for another 7 hours. The slurry thus obtained is filtered and dried at 110° C. X-ray investigation of the powder showed that, in comparison to the slurry obtained in Example 2, xonotlite and considerable amounts of perovskite ($CaTiO_3$) were present. The appearance of the crystal aggregates under the light microscope was similar to that of Example 2.

EXAMPLE 4

An aqueous solution of 15% of titanium trichloride, which contained 10% of hydrochloric acid, is hydrolyzed in water, and a mixture of quick lime and ground quartz is added as in Example 2. Thus, the mixture contains 2% by weight of $TiCl_3$, 46% by weight of calcium oxide and 52% by weight of $SiO_2$. The water/solids content is 17. The suspension thus obtained is hydrothermally treated in an autoclave with stirring and that is heated to 209° C. within 2 hours and then maintained at said temperature for another 3 hours. The slurry thus obtained is filtered and dried at 110° C. X-ray investigation showed that only xonotlite was contained in the product. The substantially spherical crystal aggregates of the xonotlite corresponded to those of Example 2.

EXAMPLE 5

To 858 g of water having a temperature of 60° C. there are added 4 g of wood particles (sawdust), and the mixture is stired for 5 min. 8.6 g of amorphous $SiO_2$ are added and stirring is continued. Then 71.13 g of calcium oxide are added and the mixture is stirred for 20 min. Then 78.6 g of quartz of an average diameter of 10 microns are added, and the mixture is stirred for 5 minutes. 1242 g of water of 60° C. are added, and the suspension is transferred into an autoclave equipped with a stirrer. The reaction is carried out at 210 °C. for 5 hours. The product obtained was subjected to X-ray diffraction analysis, whereupon it was found that as the mineral phase only alpha-$C_2SH$ had been formed.

EXAMPLE 6

This example is carried out under the same conditions as Example 5, however the sawdust is first suspended in a slurry of amorphous silica, and the calcium oxide is added only then. It is stirred for 20 min, and then the remaining amount of quartz is added and stirred within 3 min.

The slurry thus obtained is subjected to the hydrothermal reaction. X-ray analysis showed that it was xonotlite that had coated the wood particles. The product thus obtained can be readily dehydrated and further processed like conventional spherical crystal aggregates of xonotlite.

EXAMPLE 7

818 g of water of room temperature are stirred with 7.15 g of mica (ground muscovite, particle size from 30 to 50 microns) for 10 min. 71.3 g of $SiO_2$ (average diameter 10 microns) and then 80.6 g of hydrated lime are added and mixing is effected for 10 min. Then, 1242 g of water of room temperature are added, so that the total amount of water is 2100 g. The slurry thus obtained is transferred into an autoclave equipped with a stirrer and is treated at 210 °C. for 5 hours (19 bar of saturated steam). The product thus obtained consisted of xonotlite crystals together with some tobermorite which encompassed the mica flakes.

EXAMPLE 8

For the same amounts of silica, lime and water as in Example 7, 14.3 g of mica are added. Again, highly crystalline xonotlite crystals and only traces of tobermorite were formed. By X-ray diffractometry, traces of Margarite and Al-chlorite could also be detected. That demonstrates development of a particular silica layer on the mica surface. By means of electron microscopy it could be determined that there was present mica that had been encompassed by xonotlite.

EXAMPLE 9

Further experiments in accordance with Example 2 have resulted in the finding that useful results are obtained when the mixture containing from 30 to 50% by weight of calcium oxide and from 30 to 55% by weight of $SiO_2$ (also in the form of amorphous silica) is mixed with from 0.1 to 30% by weight of titanium dioxide and rapidly caused to reach the reaction temperature. The titanium dioxide may be crystalline, such as rutile or anatas, or may be present as amorphous titanium dioxide or also in the form of titanium salts that hydrolyse under the conditions. Thus, titanium (III) chloride, titanium (IV) chloride and titanium (IV) sulfate can be employed. The ratio water/solids may be varied from 9 to 20. The reaction temperature should be 200 °C. to 230 °C., and the reaction time should be from 5 to 15 hours.

EXAMPLE 10

Figure 1:
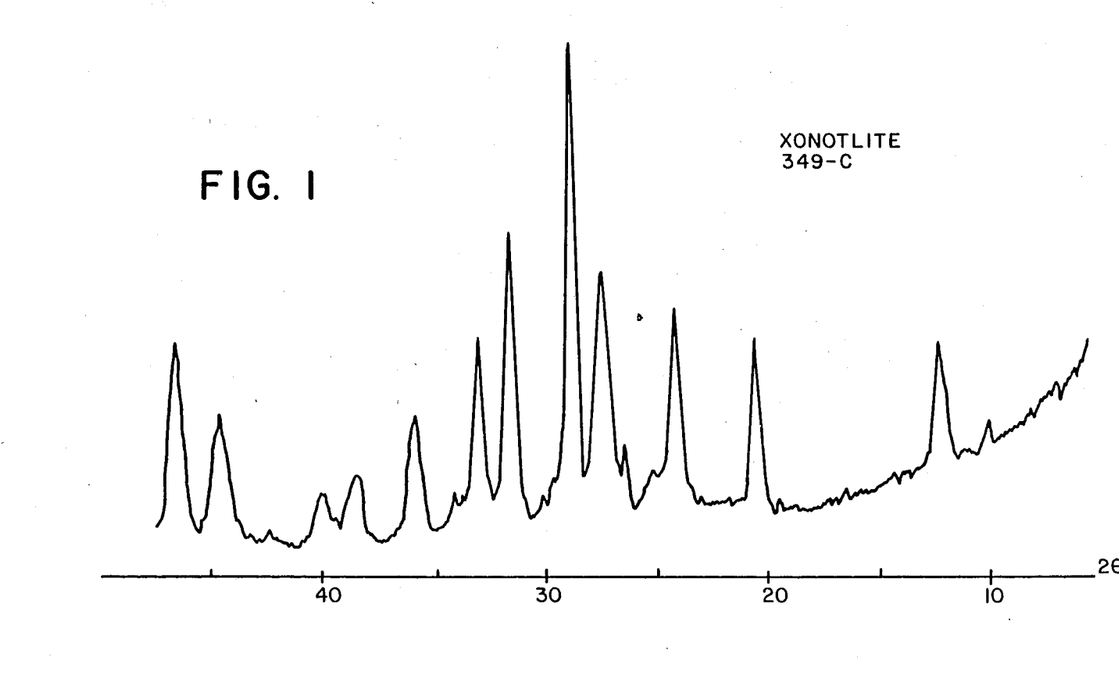
FIGS. 1 and 2 show X-ray diffraction patterns and FIGS. 4 and 5 show NMR spectra for pure xonotlite.
Figure 2:
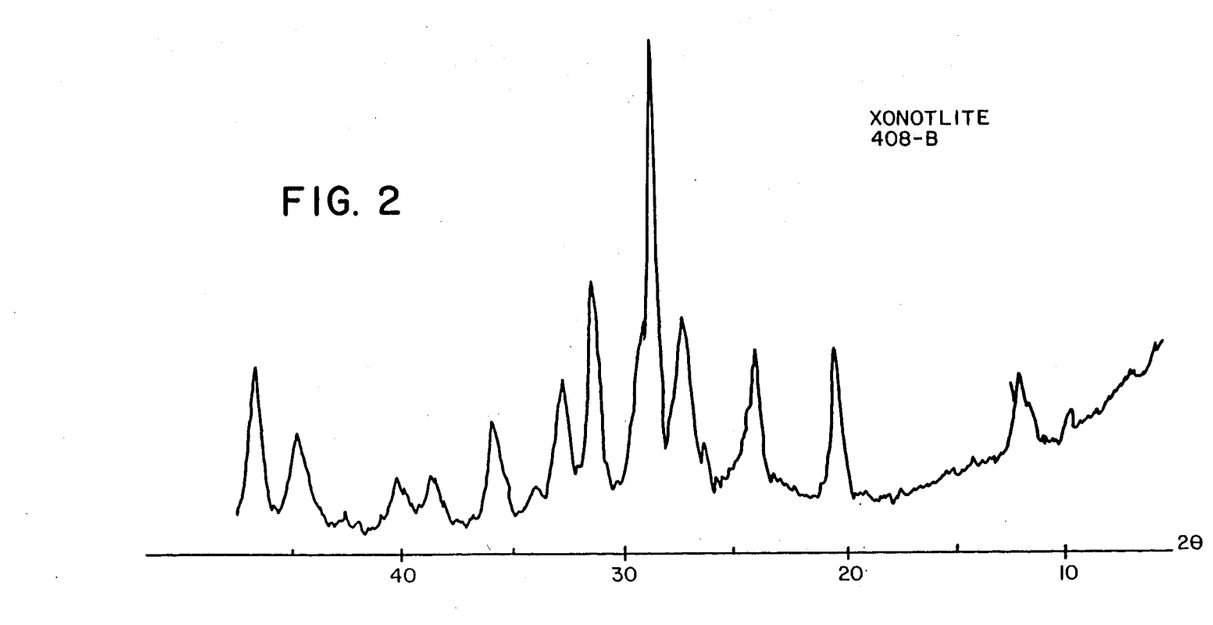
Figure 3:
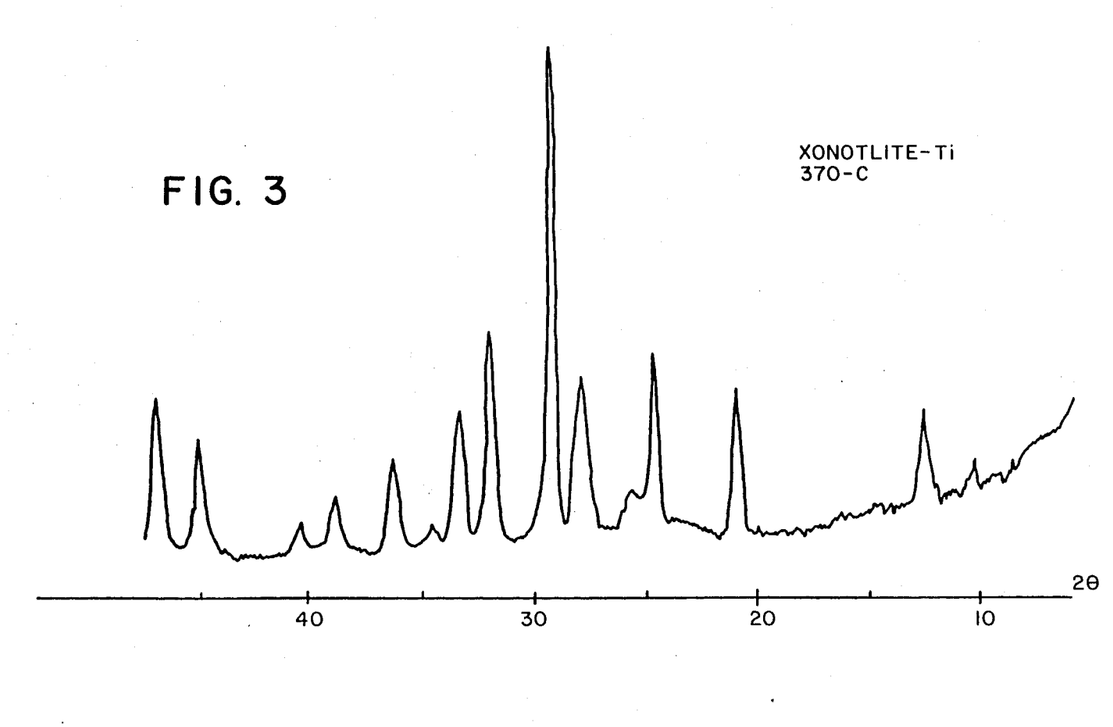

X-ray diffraction patterns are obtained for samples of pure xonotlite crystals and xonotlite crystals having silicon atoms replaced by titanium atoms according to the present invention. FIGS. 1 and 2 are the X-ray diffraction patterns for the pure xonotlite crystal samples and FIG. 3 is the X-diffraction pattern of the xonotlite crystals of the present invention. Comparison of FIGS. 1–3 shows that the presently claimed xonotlite crystals exhibit almost the same crystalline pattern as pure xonotlite, indicating true substitution in a single phase in the present invention. No presence of titanium oxide is and no separate titanium-containing phase is visible (FIG. 3), indicating effective lattice substitution.

EXAMPLE 11

Figure 4:
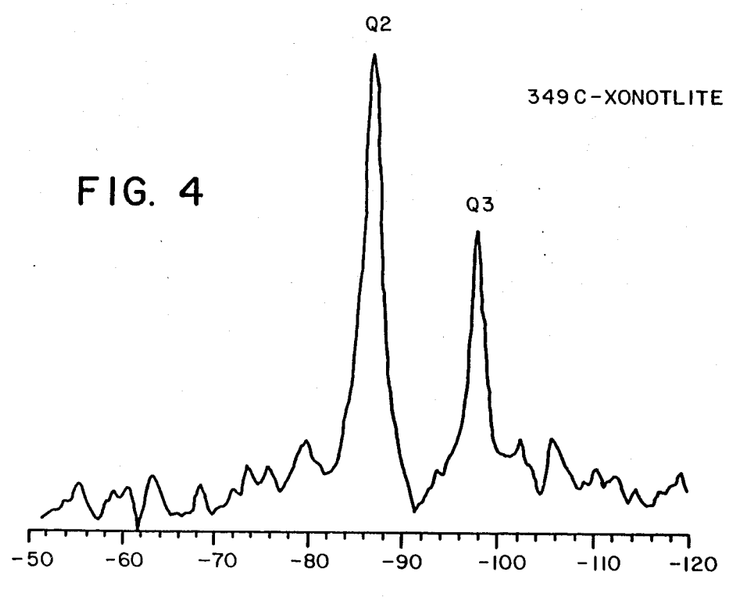
Figure 5:
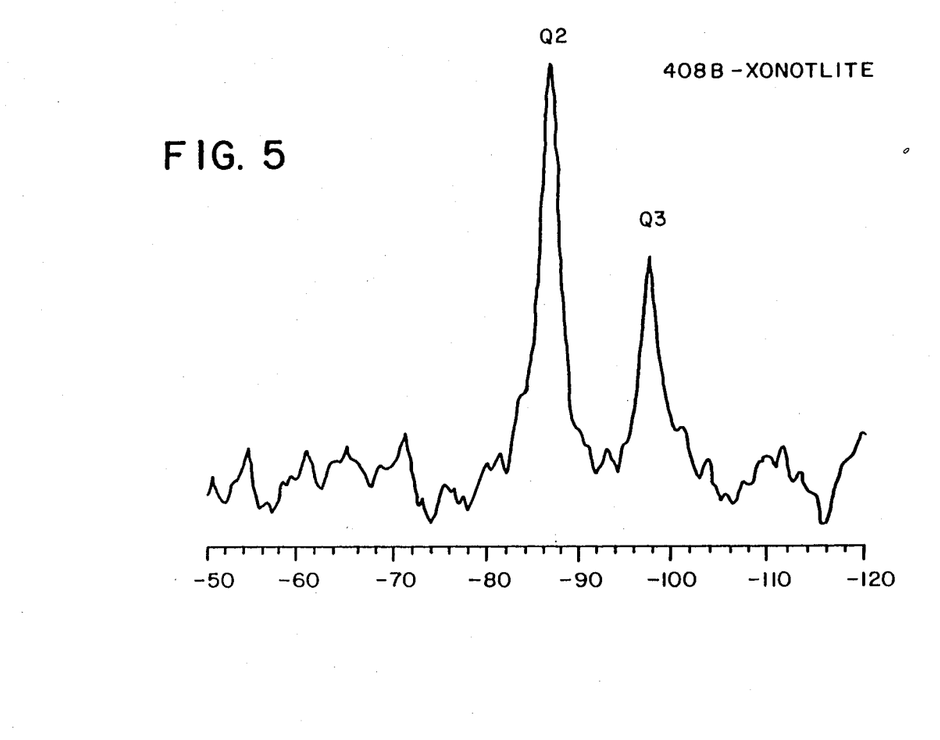
Figure 6:
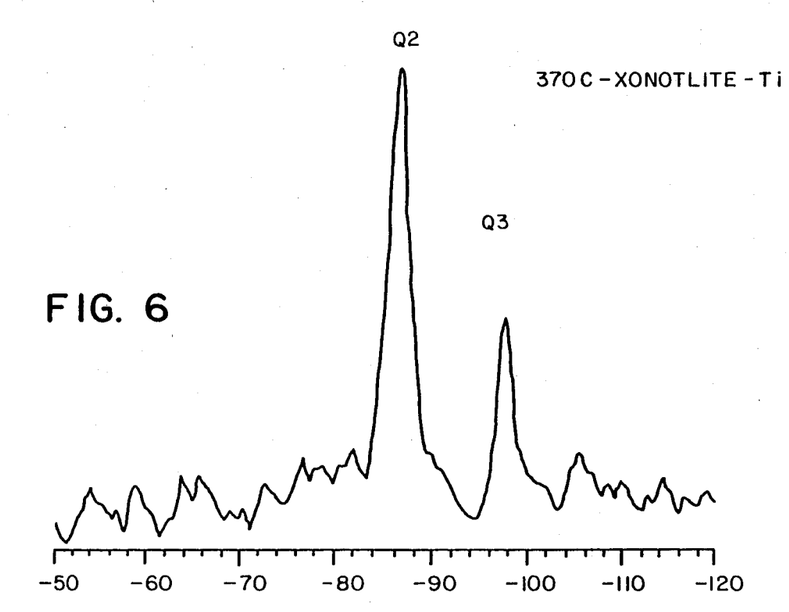
FIG. 6 shows the NMR spectrum for xonotlite crystals having silicon atoms replaced by titanium atoms according to the present invention.

NMR spectra are obtained for pure xonotlite crystals and xonotlite crystals having silicon atoms replaced by titanium atoms (titanium substituted xonotlite) according to the present invention as shown in Table 1 below.

TABLE 1

| Sample | FIG. | CaO/$SiO_2$ molar | $Q_2$ (−ppm) | $Q_3$ (−ppm) | $Q_2/Q_3$ | $Q_2$ % | $Q_3$ % | $Q_2/Q_3$ |
|---|---|---|---|---|---|---|---|---|
| xonotlite | 4 | 0.92 | 86.78 | 97.79 | 2.29 | 69.5 | 30.5 | 2.28 |
| xonotlite | 5 | 1.02 | 86.73 | 97.70 | 1.92 | 65.7 | 34.3 | 1.92 |
| titan. sub.-xonotlite | 6 | 1.02 | 86.75 | 97.64 | 4.15 | 80.6 | 19.4 | 4.15 |

Proof of lattice substitution is shown in that the ratio of NMR bands $Q_2/Q_3$ is significantly higher for xonotlite-Ti than for pure xonotlite.

For xonotlite (FIGS. 4 and 5), the NMR chemical shift spectrum of 29 Si shows 2 peaks: (Q2 and Q3) with a 2:1 line intensity ratio. This reflects the double-chain silicate structure of xonotlite in which the chain is branched at every third silicon with a 2:1 ratio of the contents of the Q2 and Q3 groups. In the titanium-substituted xonotlite according to the invention (FIG. 6), the ratio Q2/Q3 intensity is significantly higher, indicating that the Si-O-Si branching occurs only at about every sixth tetrahedron pair instead of every third in the normal xonotlite structure.

What is claimed is:

1. Synthetic, substantially spherical crystal aggregates of xonotlite having a particle size of at least 20 microns, characterized in that the silicon atoms have been replaced by titanium atoms, zirconium atoms, or a mixture thereof, wherein a maximum of 30? of the silicon atoms have been replaced.

2. Crystal aggregates according to claim 1, wherein 0.1–30% of the silicon atoms have been replaced.

3. Crystal aggregates according to claim 1, wherein 1–30% of the silicon atoms have been replaced.

4. Crystal aggregates according to claim 1 having a particle size of 20 to 150 microns.

5. Process for producing synthetic, substantially spherical crystal aggregates of xonotlite having a particle size of at least 20 microns comprising the steps of (a) mixing finely divided $SiO_2$, CaO, an active compound containing an element wherein the element is titanium, zirconium, or a mixture thereof, and water at a molar ratio of silicon+element:calcium of substantially 1:1, and (b) heating the mixture to a temperature between 140° C. and 230 °C. under stirring conditions within 2 hours.

6. Process of claim 5 wherein the particle size of the crystal aggregates is 20 to 150 microns.

7. The process according to claim 5, wherein the active compound containing an element is a finely divided reactive oxyhydrate or oxyhalide.

* * * * *